United States Patent [19]

Fisher

[11] Patent Number: 4,778,104
[45] Date of Patent: Oct. 18, 1988

[54] TEMPERATURE RESPONSIVE LINE VALVE

[75] Inventor: Stephen M. Fisher, Ridgefield, Conn.

[73] Assignee: Memory Metals, Inc., Stamford, Conn.

[21] Appl. No.: 881,722

[22] Filed: Jul. 3, 1986

[51] Int. Cl.$^4$ ............................................. G05D 23/02
[52] U.S. Cl. .................................... 236/80 R; 137/468; 137/470; 236/93 B; 236/101 D; 251/902
[58] Field of Search .............. 236/93 R, 93 B, 101 D, 236/80 R; 137/468, 470; 251/902

[56] References Cited

U.S. PATENT DOCUMENTS

| | | | |
|---|---|---|---|
| 3,263,926 | 8/1966 | Couffer et al. | 236/93 B |
| 3,368,758 | 2/1968 | Fraser | 236/93 B |
| 4,180,208 | 12/1979 | Obermaier | 236/93 B |
| 4,210,284 | 7/1980 | Tarnay et al. | 236/93 B X |
| 4,227,646 | 10/1980 | Hart et al. | 236/93 R |
| 4,570,851 | 2/1986 | Cirillo | 236/93 R |
| 4,570,852 | 2/1986 | Ohkata | 236/93 R |

Primary Examiner—William E. Tapolcai
Attorney, Agent, or Firm—Jerry Cohen

[57] ABSTRACT

Line valve apparatus for shower anti-scald and other uses comprising a housing (10) valving member (14) and a coil spring pilot valve (20) formed of a shape memory effect alloy and arranged for a first closed loop fluid blocking configuration to prevent, and second open spiral loop configuration(s) to enable, coil expanding valving member movement under the combined force of line back pressure and the coil expanding forces per se as a rising fluid temperature puts the alloy through a martensitic to austentitic transformation.

7 Claims, 6 Drawing Sheets

TEMPERATURE RESPONSIVE LINE VALVE

BACKGROUND OF THE INVENTION

The present invention relates to line valves, particularly in shower-head lines and other domestic water lines, characterized by valving position change in response to temperature of fluid in the line—e.g., for shower anti-scald purposes.

The state of the art going back over a Century simply has not resulted in an effective, economical means for accommodating temperature response to high volume, low cost anti-scald systems.

It is the object of the present invention to meet such need.

SUMMARY OF THE INVENTION

In accordance with the invention a pilot valve system is employed wherein a coil spring of metallurgical-transformation-memory material (e.g., martensitic transformation shape memory effect (SME) alloy) is employed. The coil spring, closed, is an effective annular valve emplaced in a shower head line, with water passing around it. Upon over-heating of such water the coil automatically expands open with a high force (compared to the relatively low force of a bimetallic couple thermostat spring). Water can then rush through the inter-turn openings of the expanding spring. The water then reaches the head of a valve arranged for piston-like closing movement and line water pressure effects the main valve closing action, preferably in opposition to a calibrating, bias spring. But the pilot SME spring assists the valve closing action.

A water bleed leakage path directly through the closed valve and line is provided to relieve water line pressure. But line water pressure holds the main valve shut. When the water in the line cools, the SME spring contracts to its original closed state and the main valve is reset under the push of the bias spring, while residual water is bled out from within the closing pilot valve coil spring.

The housing of the foregoing can be a distinct line segment or an insert cylinder inserted into an existing line.

The invention may be employed in several variants of usage (e.g., closing or opening, response to cold or hot water, gas or liquid line usage).

Preferably means are provided for insuring laminar (gas) or lamellar (liquid) flow in the line so that good heat transfer is obtained to the coil spring pilot and flow perturbation and/or caviation avoided.

A major consideration in the design of the valve is the Bernoulli or Venturi effect. If the valve plug is held back from the flow where no low pressure area exists, then the valve is not sensitive to line surge. When the valve plug is moved forward into the flow region, where a restriction can occur, then the valve shuts due to flow. If the dimensions of the plug and the housing sidewall are optimized, then it takes very little movement on the part of the SME spring to cause the plug to move into a condition where it is pulled shut due to water flow. It acts very much like an over-center device. This is especially true for a spherical plug and an elliptical sidewall.

Other objects, features, and advantages will be apparent from the following detailed description of preferred embodiments taken in conjunction with the accompanying drawing in which:

DETAILED DESCRIPTION OF PREFERRED EMBODIMENTS

Figure 2:
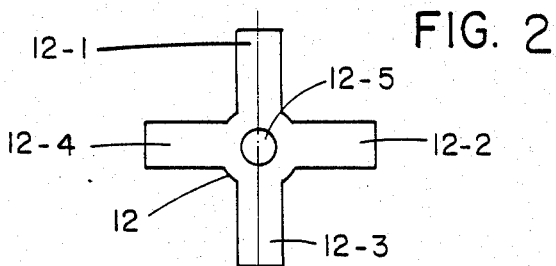
FIGS. 1-4 are partial sectional views of portions of a first embodiment of the invention (including a variant of spring construction in FIG. 1A)

Referring now to FIGS. 1-4, there is shown a first embodiment of the invention installable between a flow pipe FP and shower head (nozzle) SH. The embodiment comprises a housing 10 with an internal flow guiding member 12 secured therein (by welding, integral casting or molding therewith, but preferably by screw threading as shown). The flow-guide can be a plate with holes, a corrugated flow divider, or, preferably, a star or cruciform shape with legs 12-1, 12-3, 12-3, 12-4 all of airfoil form and a central leading hub 12-5 of curving conical form to form a smooth lamellar flow of water in the spaces between the airfoil legs.

A valving member 14 with an annular shoulder 16 is movable from the position shown, downwardly, for butting against annular seat 18 of housing 10 to substantially seal the line. A shape memory coil spring 20 seats on a ledge 14-1 of valving member 14 and is compressed between the ledge and the bottoms of legs 12-1, 12-2, 12-3, 12-4 to form a closed interior space within the coil of spring 20. In a variant of construction shown at FIG. 1A, the spring can be coated with rubber (or other elastomeric material) as indicated for two turns 20-1 and 20-2 by coating layers thereon, 20-1R and 20-2R, respectively, to insure blockage of water flow from exterior to interior of the coil.

The spring 20 expands upon onset of scald condition to open flow passages between the spiral turns and begin separation of valving member 22 from the fixed hub of member 12, moving downwardly against bias spring 24. Water can then find its way to the head 22H of valving member 22 to create a back pressure moving 22 rapidly (more rapidly than the expansion per se of SME spring 20 would effect) against the bias spring 24 until shoulder 16 seats on 18 to stop major hot water flow. A small bleed flow passes via loose clearance around shaft 26 and out the shower head. But the main hot flow is stopped.

Figure 1:
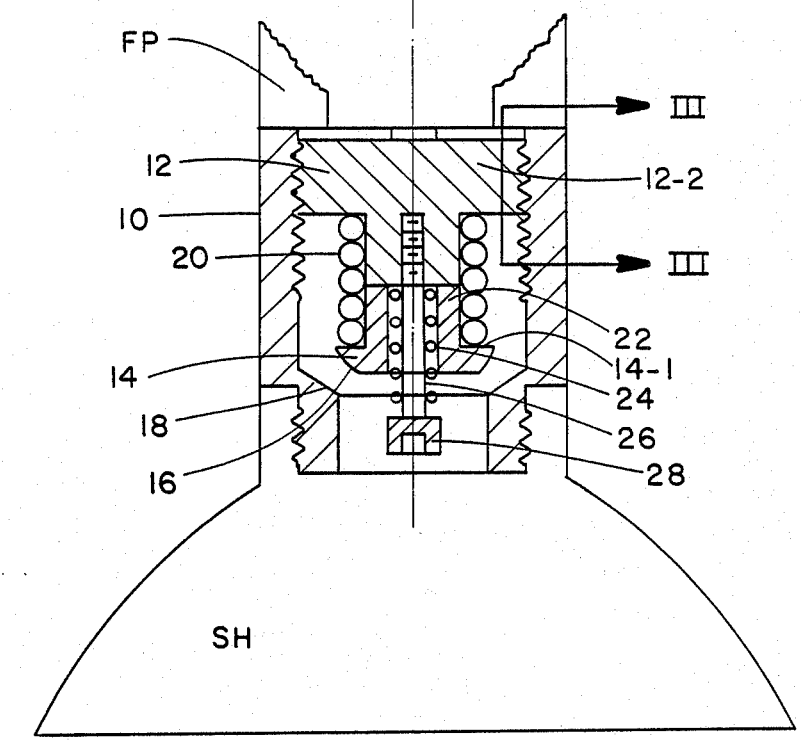
Figure 3:
Figure 1A:
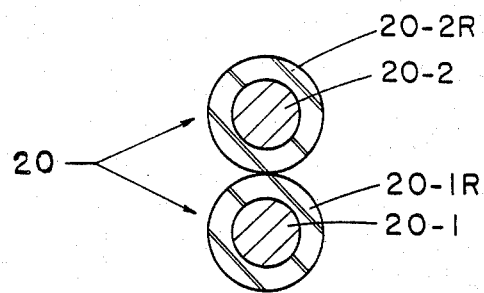
Figure 4:
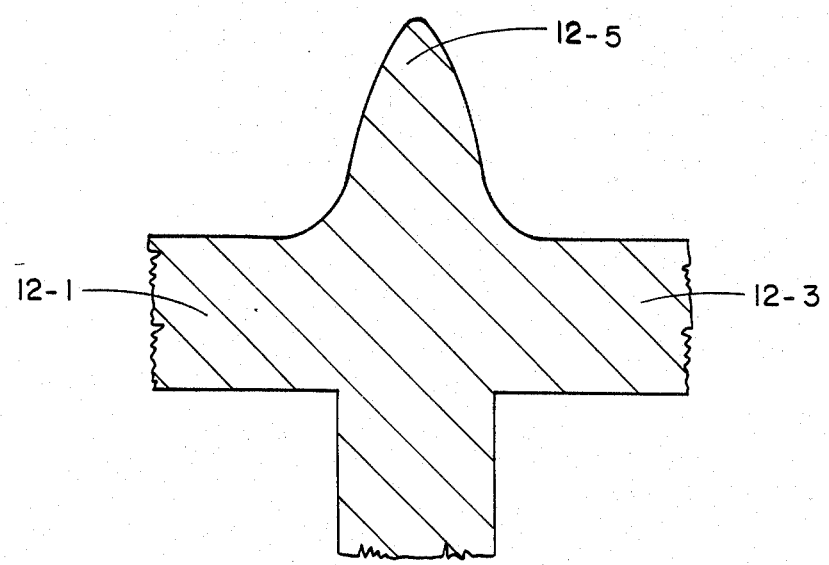

Reset may be accomplished in the following two modes, among others, in two constructions:

(1) Turning off the hot water via a line valve (not shown) and continued bleed flow reduces the back pressure and allows bias spring 24 to push valving member up to the FIG. 1 position for reset.

(2) However, the apparatus shown in FIGS. 1-4 requires the cold water to be shut off also because the bias spring does not have enough force to overcome line pressure.

The SME spring 20 is preferably made from an inexpensive, corrosion resistant material affording a shape memory phenomenon e.g., to austenitic transformation in 100°-130° F. range, as specified for scald condition, e.g., a 65-75 weight percent copper alloy with zinc or nickel (20-30%) and aluminum (5-15%). Other alloys may be employed, in accordance with metallurgical criteria well known per se.

Figure 5:
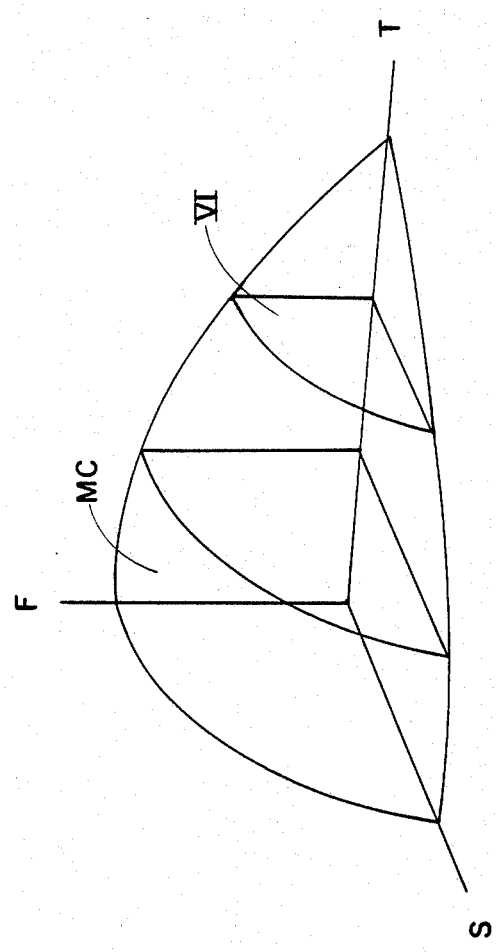
FIGS. 5-7 are graphs indicating qualitatively, force-temperature-strain (deflection) relationships and related design considerations in practice of the invention.
Figure 6:
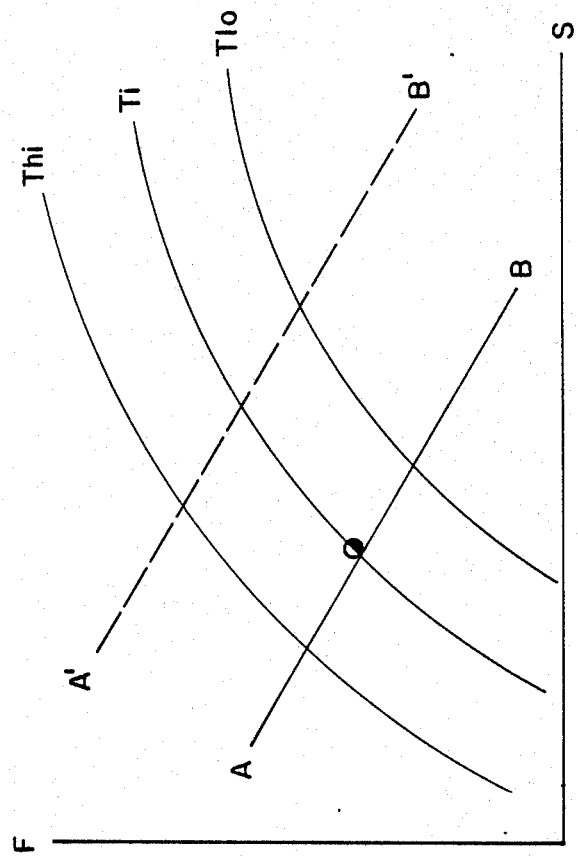
Figure 7:
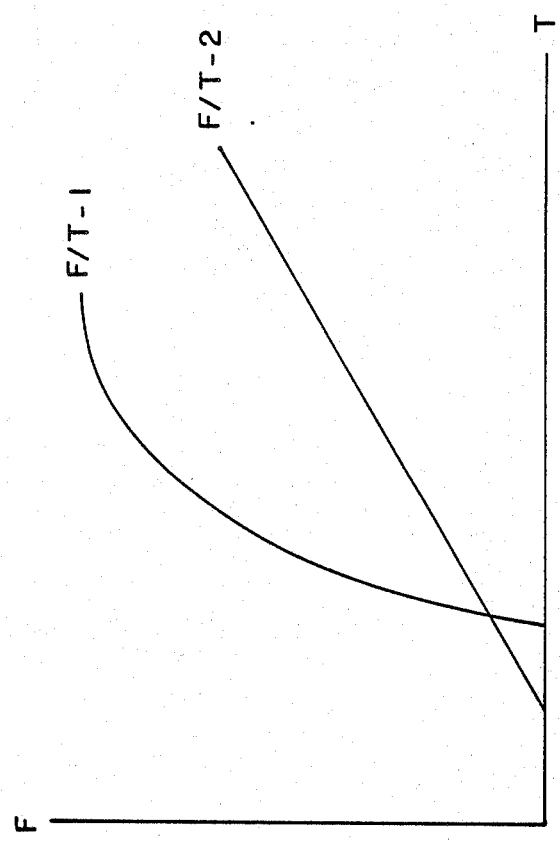

FIGS. 5-7 show qualitatively the general criteria of SME alloy and bias selection. The ternary diagram of FIG. 5 indicates force F on the y-axis, temperature T on the x-axis, and deflection S on the z-axis with the range of material characteristics forming a shell MC including a series of planar F/P curves as shown e.g., at VI and in FIG. 6, within which a design line AB or A'B' can be established by a bias spring of selected spring constant to pick a force/deflection behavior at a given temperature To between low and high. FIG. 7 shows force vs. temperature characteristics without (F/T-1) and with F/T-2) a bias spring.

This selected SME alloy per se might have 100° F. as the temperature for the onset of transformation and resultant expanding force application, but adjusted via bias spring selection to expand effectively at 120° F. (the design trigger).

As temperature drops well below 100° F. and pressure is relieved, the return transformation of spring 20 (with very little hysteresis) lowers its resistance to the bais spring and the tight water blocking coil form of spring 20 is reestablished and valving member 14 is lifted.

The coil spring 20 is a valve per se (compare U.S. Pat. No. 4,227,646 granted Oct. 14, 1980, and now of common assignment herewith), but only a pilot valve. The principal valve closing and holding action comes from hot water line pressure per se.

Figure 8:
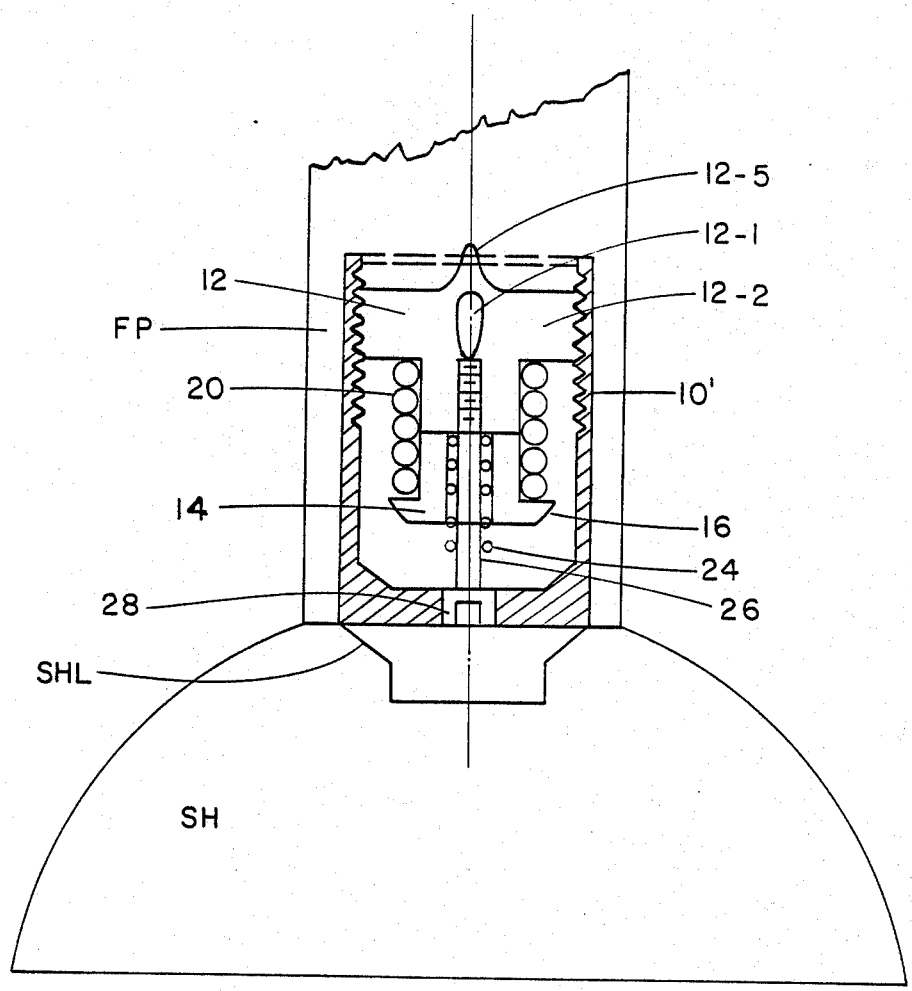
FIG. 8 is a partial section view of a second embodiment.

A further embodiment of the present invention shown in FIG. 8 enables complete avoidance of hot water line lengthening. In this embodiment a smaller casing 10' (compared to casing 10 of FIG. 1) fits entirely within FP and has an annular corner seating on a natural ledge SHL of the shower head at the FP/SH connection. The structure within housing 10' is essentially similar to the valve structure of FIG. 1 above.

The FIG. 1 and FIG. 8 embodiments and respective equivalents have other aplications including all household water lines as well as shower lines, as safety valves for release from forced hot water heat lines in case of overheating, steaming, fire or other emergency; similar industrial and vehicle safety applications; fuel, food and chemical process liquids control; and the like. The direction of open/close shown in FIGS. 1 and 8 can be reversed to open a main valve rather than close one in case of an over-temperature condition. Conversely, SME alloy and implementing structure can be arranged to trigger on a falling (rather than rising) temperature condition in main valve opening or closing modes. In each such instance, the SME spring in coil or other form as used as a pilot valve and the main liquid (or gas or solid/gas or solid/liquid slurry) is used as the primary valve operator.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Line valve apparatus affording fast response and limited line lengthening comprising in combination,
    (a) means defining a tubular flow housing with a flow line,
    (b) means defining a linearly movable valve member with a stem and shoulder with a curving face and back shoulder, and a lower upwardly facing conical valve seat within the housing, said member being movable downward for butting said curving face against the valve seat and said housing being constructed and arranged to utilize line fluid flow pressure as the primary force for valving member movement control,
    (c) means defining a shape memory material spring of helical coil form surrounding the stem and inserted between the shoulder and a fixed structure and constructed and arranged together with said valve member to effect pilot control of the line fluid flow pressure to selectively enable or disable member movement against a bias force, and
    (d) means for restoring said bias force against the valve member to raise the latter.

2. Line valve apparatus in accordance with claim 1 and further comprising:
    (a) means for automatically bleed adjusting line flow to terminate control of said valve member.

3. Line valve apparatus in accordance with claim 1 wherein said housing comprises means for establishing a smooth flow of fluid over the coil member and avoiding turbulence.

4. Line valve apparatus in accordance with claim 1 wherein the housing is an in-line interruption of the flow line.

5. Line valve apparatus in accordance with claim 1 wherein the flow line itself constitutes said housing to thereby effect no lengthening thereof by use of said valve apparatus.

6. Line valve apparatus in accordance with either of claim 5 or 6 as an anti-scald domestic hot water line.

7. Line valve apparatus in accordance with claim 6 as an anti-scald shower valve.

* * * * *